P. BARDUCCI.
APPARATUS FOR TREATING ALIMENTARY PASTES.
APPLICATION FILED MAR. 3, 1913.
1,232,178. Patented July 3, 1917.
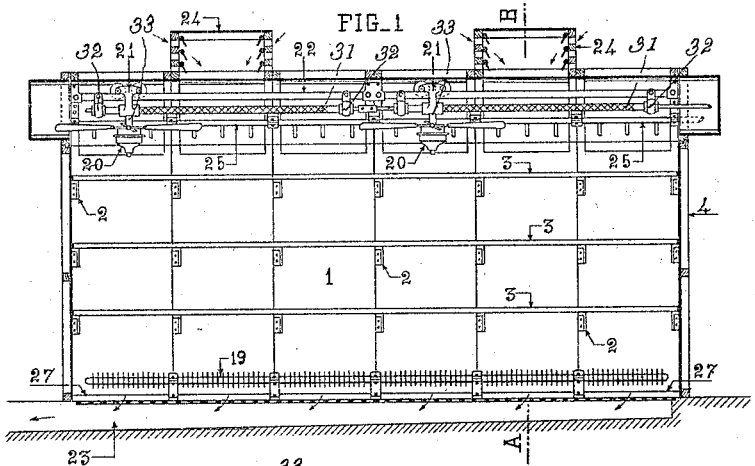
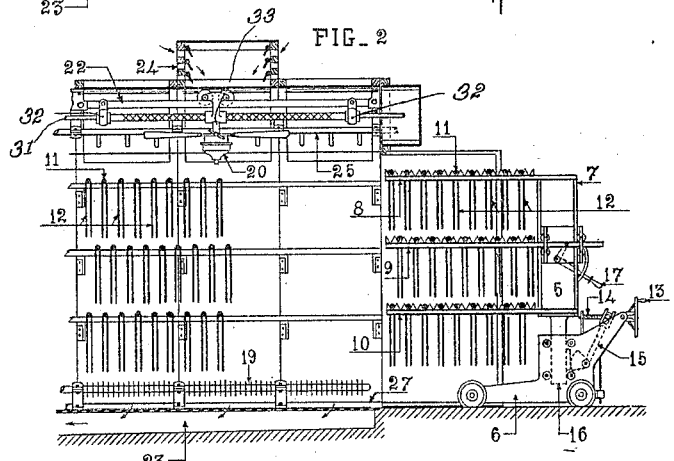
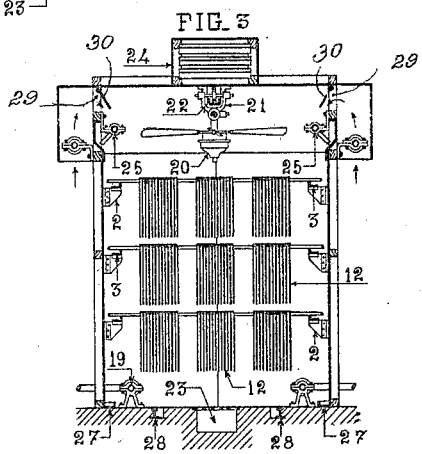

UNITED STATES PATENT OFFICE.

PILADE BARDUCCI, OF NAPLES, ITALY.

APPARATUS FOR TREATING ALIMENTARY PASTES.

1,232,178. Specification of Letters Patent. Patented July 3, 1917.

Application filed March 3, 1913. Serial No. 751,952.

*To all whom it may concern:*

Be it known that I, PILADE BARDUCCI, a subject of the King of Italy, and residing at 16 Viale Elena, Naples, Italy, have invented certain new and useful Improvements in Apparatus for Treating Alimentary Pastes, of which the following is a specification.

The present invention has for its object to provide means for effecting artificially the exsiccation of alimentary pastry in accordance with the Neapolitan process.

In the Neapolitan process of exsiccation which is more particularly used in the manufacture of long pastry, such as macaroni and the like, the paste is alternately submitted to hardening and resoftening processes. The hardening process consists in submitting the paste to a rapid exsiccation, whereby a thin crust is formed on it which renders it extremely friable, and it is caused to bend, while in the resoftening process the paste which has first been submitted to the hardening process, is laid out in cool, moist rooms, where the said crust which has been formed on it during the hardening process, absorbs the moisture still left in the paste, and is thus again rendered soft and pliable, so that the paste strings are stretched out again through their proper weight and acquire a certain elastic consistency.

In carrying the said Neapolitan process into effect, the paste which is hung over sticks or rods, preferably of cane, is alternately brought out into the open air and exposed to the sun, and transported into cool, moist rooms, such as caverns and cellars, and vice versa.

The present invention has for its object to provide a cell or compartment, into and out of which the paste may be transported by mechanical means, while remaining on the sticks or rods, and in which the same is alternately submitted to hardening and resoftening processes without being removed, until it has been completely dried.

The invention is illustrated in the annexed drawings, in which—

Figure 1 is a longitudinal section of a cell constructed in accordance with the present invention.

Fig. 2 is a longitudinal section of the improved cell shown in combination with the truck for handling the paste.

Fig. 3 is a cross section of the cell or compartment on the line A—B of Fig. 1.

The numeral 1 indicates a cell or compartment preferably of rectangular shape and constructed of any desired material, its inside walls being made of or lined with watertight material.

Along the longitudinal walls inside each cell and at suitable distances apart are arranged small brackets —2— which carry the longitudinal bearers —3— adapted to support the sticks or rods on which the paste is hung, said bearers being arranged at a suitable distance from the walls.

The cell or compartment —1— has a front opening —4— through which the truck —5— may enter. This is adapted to run on rails —28— which extend into the cell, and it carries a tower —7— consisting of several pairs of arms —8—, —9—, —10—, which support the rods or sticks —11— on which the strings of paste —12—are hung. The tower —7— may be raised and lowered by any suitable means and as shown this means comprises a hand-wheel —13— which rotates a screw —14— which rocks a lever —15—. The lever 15 engages supports —16— on which the tower is mounted and when the screw —14— is rotated in one direction these supports will be elevated. The intermediate arms —9— may be moved in longitudinal direction by means of any suitable device, for instance by a lever —17—, for the purpose of interchanging the strings of paste of the various rows, by bringing the intermediate pairs of arms into the position shown in the drawing. This displacement is essential when the truck is loaded automatically.

The truck loaded with sticks or rods carrying the strings of paste, may from any place of the works be brought before the inlet opening of the cell by means of a wheeled frame or bogie (not shown in the drawing) carrying a transverse track part corresponding to the track —28— in the cell and running on a second track arranged at right angles with the track —28—. The truck enters the cell with its tower raised, and the intermediate pairs of arms are brought into the position shown in the drawing. By actuating the hand-wheel —13—, the tower will be lowered, and as the distance between the various rows of the longitudinal bearers —3— inside the cell and also the number of these rows correspond to the various pairs of arms of the said tower, all the sticks or rods —11— with the strings of paste hung on them, are brought to arrange themselves in proper position on the longitudinal bearers —3—. The truck is thus emptied and can be withdrawn and taken out of the cell.

When a cell has been filled with paste and the opening been closed, the exsiccation process may be started in accordance with the above indicated Neapolitan process.

The various stages of the exsiccation of the paste are obtained through the heating of the air in the cell, through stirring the air by mechanical means and through a gradual and also continuous renewal of air.

The heating may be effected by means of any conveniently arranged thermic device, and preferably by means of a circulating steam radiator —19— arranged in proximity to the pavement and along the longitudinal walls of the cell.

The air is stirred by means of one or more rotary air agitators —20— preferably actuated by an electromotor, and each of them suspended from a trolley —21— running along a horizontal beam —22— arranged on the ceiling of the cell.

These fans are mounted freely in the chamber and rotate around a vertical axis, so that each fan generates a direct air current and simultaneously a return current in opposite direction.

During the operation of these fans they are reciprocated from end to end in the cell so that the air currents generated by the fans move continuously to and fro within the cell.

Air is admitted to the cell through the ventilating towers 24 or through ports 29 closed by means of damper 30. The air passes out of the cell through perforations in the floor thereof in communication with a channel 23. The fresh air enters the cell in the same quantity, as air is withdrawn, through the ventilating tower —24— or through holes 29 provided in the upper part of the cell and having dampers adapted to be opened in consequence of the action of the suction devices.

The resoftening phases are obtained by interrupting the heating and the ventilation and by causing a continuous flow of water down the longitudinal walls of the cell, which, as has been said, are made of or lined with water-tight material. The water is supplied by means of tubes —25— or the like, arranged along the top of the walls and falls into channels —27— through which it is then brought out of the cell.

It will be easily understood that by operating the truck —5— in the inverse way to that above described, the dried paste may be removed from the cells. If the arrangement of the works admits it, the cell may have a back door —18—, in which case the paste is brought into the cell from one side and is removed on the other side for the purpose of preventing that the two operations interfere with each other.

What I claim is:

1. In a housing for exsiccating long alimentary pastes, the combination with means for hanging the paste, of means for introducing air and means for discharging the air, means for simultaneously generating downward and upward air currents, these means moving continuously to and fro within the cell.

2. A housing for exsiccating long alimentary pastes, comprising means for hanging the paste within said housing, and means for simultaneously generating air currents upwardly and downwardly within said housing, and said air currents being more intense in one direction and less intense in the opposite direction, and means for continuously moving said air currents within said housing and each maintaining a constant direction.

3. Housing for exsiccating long alimentary pastes, comprising, in combination, means for hanging the paste, means for introducing air, means for discharging the air, an air agitator rotatable about a vertical axis and mounted freely within the housing, and means for moving the air agitator to and fro within the housing.

In testimony whereof I have signed my name, in the presence of two subscribing witnesses, the 20th day of February, 1913.

PILADE BARDUCCI.